United States Patent [19]

Ekanadham et al.

[11] Patent Number: 5,822,577
[45] Date of Patent: Oct. 13, 1998

[54] CONTEXT ORIENTED BRANCH HISTORY TABLE

[75] Inventors: Kattamuri Ekanadham, Yorktown Heights; Rudolph Nathan Rechtschaffen, Scarsdale, both of N.Y.

[73] Assignee: International Business Machines Corporation, Armonk, N.Y.

[21] Appl. No.: 641,610

[22] Filed: May 1, 1996

[51] Int. Cl.[6] .................................................. G06F 9/42
[52] U.S. Cl. ............................................................ 395/587
[58] Field of Search .................................... 395/580, 581, 395/586, 587

[56] References Cited

U.S. PATENT DOCUMENTS

| | | | |
|---|---|---|---|
| 3,559,183 | 1/1971 | Sussenguth | 395/584 |
| 4,477,872 | 10/1984 | Losq et al. | 395/587 |
| 5,210,831 | 5/1993 | Emma et al. | 395/587 |
| 5,276,882 | 1/1994 | Emma | 395/587 |
| 5,345,571 | 9/1994 | Morisada | 395/587 |
| 5,367,703 | 11/1994 | Levitan | 395/800.23 |
| 5,394,530 | 2/1995 | Kitta | 395/587 |
| 5,404,467 | 4/1995 | Saba et al. | 395/383 |
| 5,507,028 | 4/1996 | Liu | 395/383 |

OTHER PUBLICATIONS

IBM Tech. Disc. Bull. V.36 #12 Dec. 1993 "Context Oriented Branch Prediction", K. Ekanadham and R. Rechtschaffen, pp. 181–183.

Micrprocessor Report, Mar. 27, 1995 "New Algorithm Improves Branch Prediction", L. Gwennap, pp. 17–21.

Proc. Micro–28, 1995 IEEE, "Dynamic Path–Based Branch Correlation" R. Nair, pp. 15–23.

CS252 Graduate Computer Architecture Class Project Dec. 10, 1995 "A Comparative Analysis of Branch Prediction Schemes" Zhou et al Computer Science Div. Univ. of Calif. at Berkeley Webnet: http://http,cs,berkeley.edu/~zhendong/ca252.html.

International Symp on Microarchitecture, IEEE Computer Society Press "Alternative Implementations of Hybrid Branch Predictors" P–Y. Chang et al, Nov. 29–Dec. 1, 1995 pp. 252–257.

20th Annual Internation Sym. on Computer Architecture, May 1993, "A Comparison of Dynamic Branch Predictors that Use Two Levels of Branch History", T.Y. Yeh et al, pp. 257–266.

*Primary Examiner*—David Y. Eng
*Attorney, Agent, or Firm*—Jay P. Sbrollini

[57] ABSTRACT

The history table of the present invention is utilized to record a context oriented predictor associated with one or more branch instructions. The context oriented predictor preferably is derived from the history table by incorporating within each entry of the history table a vector of branch predictors. This vector comprises for each value of n (where n can be arbitrarily set, yet preferably remains fixed within a given implementation), a set of 2 predictors. When the prefetching action of a processor causes the history table to be accessed, the vector of predictors for a given branch, called the ancestor branch, is retrieved from the history table and stored. After n such retrievals, the action history of the last n branches is used to access a predictor from the vector of predictors that was associated with the n-th ancestor (or predecessor) of the next upcoming branch. This predictor is used to predict the n-th successor branch of the ancestor branch. If necessary, the subsequent action of such n-th successor branch is used to update the predictor derived from the vector associated with the ancestor branch, and the vector is restored to the history table at the location indexed according to the ancestor branch instruction. The context oriented history table may be embodied in a BHT or DHT.

27 Claims, 6 Drawing Sheets

CONTEXT ORIENTED BRANCH HISTORY TABLE

BACKGROUND OF THE INVENTION

1. Field of the Invention

The present invention relates to data processing systems, and, more particularly, to the prediction of branch instructions executed by such data processing systems.

2. Background Art

Figure 1:
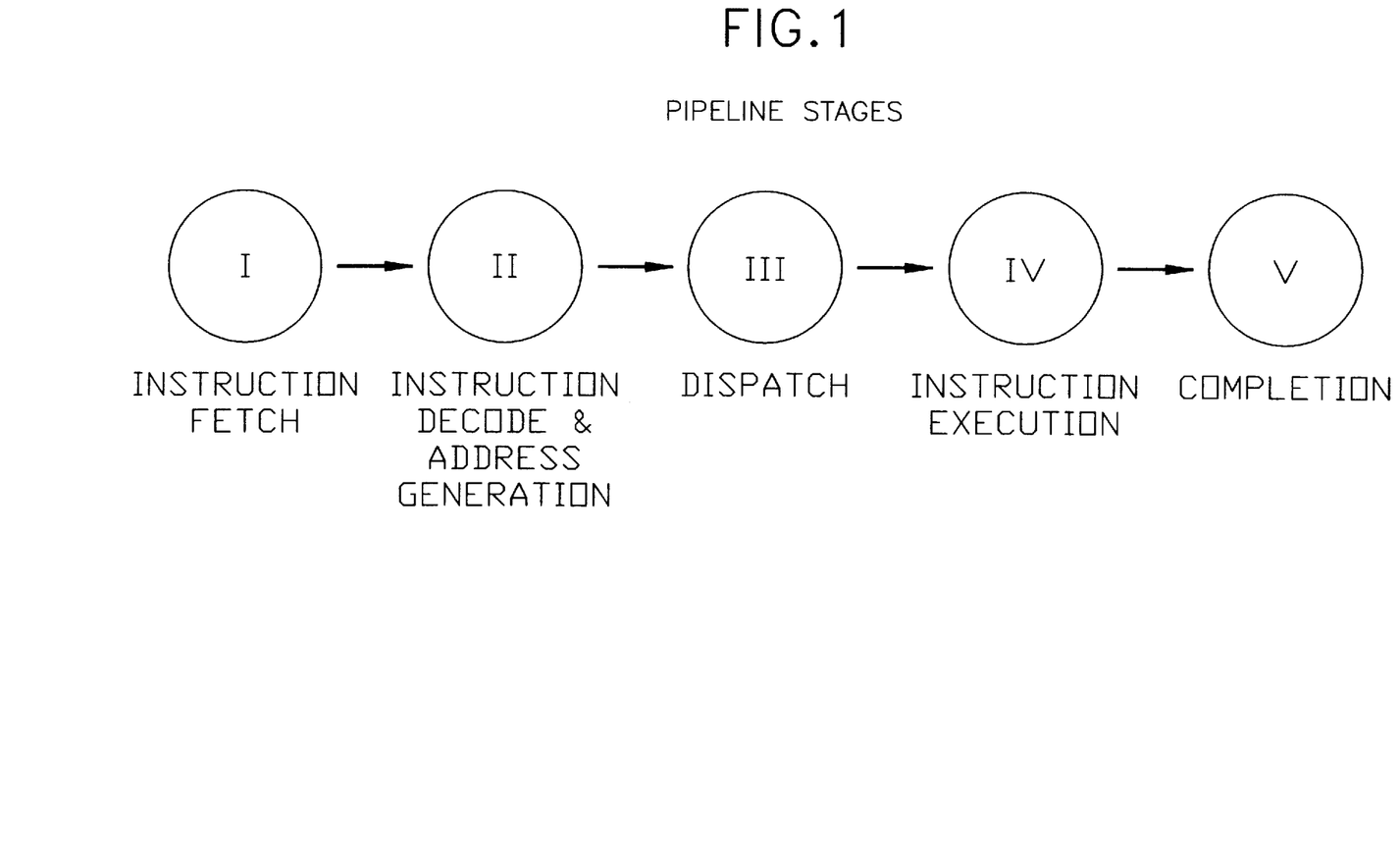
FIG. 1 is a pictorial representation of the stages of a pipelined processor.

The major components that make up a processor's pipeline is illustrated in FIG. 1. The components are instruction fetch (stage I), instruction decode and address generation (stage II), dispatch (stage III), instruction execution (stage IV), and completion (stage V). Each instruction enters the pipeline and ideally spends one cycle at each pipeline stage. Thus, ideally, each instruction takes five cycles to pass through the pipeline. However, if the pipeline can be kept full then each component of the processor (pipeline stage) can be kept active working on a different instruction, each at a different pipeline stage, and one instruction can completed in every cycle.

As described above, a pipeline processor must fetch the next instruction into the execution pipeline before the current instruction has been executed. If the current instruction is a conditional branch instruction, the processor must decide whether to fetch from the target address of the branch, assuming the branch will be taken, or from the next sequential address, assuming the branch will not be taken. An incorrect guess causes the pipeline to stall until it is refilled with valid instructions; this delay is called the branch penalty. Several systems are known in the art that attempt to reduce the branch penalty associated with conditional branch instructions through the use of a history table.

U.S. Pat. No. 3,559,183 to Sussenguth, which is assigned to the assignee of the present invention, sets forth an instruction fetching mechanism utilizing a branch history table (BHT). It is based on the observation that most branches, considered individually, are consistently taken or not taken and if taken will have a consistent target address. In this strategy, a table of taken branches is constructed. Each entry in the table consists of the address of the taken branch followed by the target address of the branch. This table is a hardware construct and, thus, has a predetermined size, typically from 1024 to 4096 entries. Entries are made only for taken branches as they are encountered. When the table is full, adding a new entry requires displacing an older entry. This may be accomplished by a Least Recently Used (LRU) algorithm as in caches.

In principle, each branch instruction in the execution pipeline of the processor is looked up in the table, by its address, and if it is found, its target is fetched and becomes the next instruction loaded into the pipeline. If the branch is not in the table, it is presumed not taken. As the execution of the branch instructions proceeds, the table is updated accordingly. If a branch predicted to be taken is not taken, the associated table entry is deleted. If a branch predicted not to be taken is taken, a new entry is made for it. If the predicted target address is wrong, the corrected address is entered.

U.S. Pat. No. 4,477,872 to Losq et al., which is assigned to the assignee of the present invention, sets forth a decode time prediction mechanism utilizing a decode history table (DHT). The DHT is a table of entries wherein an entry is accessed based on a transformation, such as a hashing transformation or a truncating transformation, on the bits that compose the address of the branch instruction to be predicted. The entry itself comprises a single bit: the bit is set if the corresponding branch instruction was taken the last time it was executed, otherwise the bit is not set. Thus, the DHT operates similarly to a BHT. However, the DHT typically does not include a unique entry corresponding to each branch instruction as does the BHT. This allows the DHT to be smaller in size, yet may lead to poorer performance than the BHT.

Other systems have been proposed that add additional information to (or associate additional information with) the entries of the BHT/DHT to better predict the outcome of the conditional branch instructions.

J. Smith, "A Study of Branch Prediction Strategies," 24th International Symposium on Computer Architecture, May 1981, pp. 135–148, proposes that two-history bits be used to predict the outcome of a given branch instruction. In this method, the two bits can be thought of as a saturating counter that is incremented when the branch instruction is resolved taken, and decremented when the branch instruction is resolved not-taken.

Yeh and Pratt, "A Comparison of Dynamic Branch Predictors that use Two Levels of Branch History," Conference Proceedings Annual Symposium on Computer Architecture, 1993, published by IEEE Computer Society Press, Los Alamitos, Calif., pp. 257–266, sets forth three schemes that use two levels of storage to predict the outcome of a given branch instruction. The first level of storage maintains one or more entries each representing the state (taken/not taken) of the last K branches. The second level of storage, called a pattern table, includes a plurality of two-bit entries wherein one (or a group of entries) correspond to the state encoded by the corresponding entry in the first level of storage. The two bits of each entry of pattern table track the results of the previous iterations that occurred when a particular state is encoded by the corresponding entry in the first level of storage.

In the first scheme (Global History Scheme), the first level of storage, labeled a global branch history register, stores the state of the last K branches encountered. In the second scheme (Per-Address History Scheme), the first level of storage, labeled a Per-Address Branch History Table, stores a plurality of entries, wherein each entry is indexed by a static branch instruction address and encodes the state of the last K occurrences of the particular branch instruction which is identified by the static branch instruction address index. In the third scheme (Per-set History Scheme), the branch instructions are partitioned into a plurality of sets. The set attribute of a given branch may be determined by the branch opcode, branch class assigned by a compiler, or branch address. In the third scheme, the first level of storage, labeled a Per-set Branch History Table, stores a plurality of entries, wherein each entry is indexed by a set attribute and encodes the state of the last K branch instructions within the particular set identified by the set attribute index.

The association of the entries of the pattern table in each of the three schemes has three possible variations:

1) a single entry is associated with the state encoded by the corresponding entry in the first level of storage (called the global pattern history table);

2) a group of entries are associated with the state encoded by the corresponding entry in the first level of storage, however, each entry in the group is further indexed by the static branch address of a particular branch instruction (called per-address pattern history table); and 3) a group of entries are associated with the state encoded by the corresponding entry in the first level of storage; however, each entry in the group is further associated with a set attribute of a given set of branch instructions (called per-set pattern history table).

The two-level branch prediction mechanism of Yeh and Pratt operates as follows. When a branch instruction is encountered, the first level of storage is accessed and the entry corresponding to the particular branch instruction is read from the first level of storage. In the first scheme, the first level of storage holds only a single entry, and that entry corresponds to the particular branch instruction. In the second scheme, the entry of the first level of storage that corresponds to the particular branch instruction is identified as that entry whose index matches the address of the particular branch instruction. In the third scheme, the entry of the first level of storage that corresponds to the particular branch instruction is identified as that entry whose index matches the set attribute associated with the particular branch instruction.

The state encoded by the entry read from the first level of storage (and possibly other information, for example, the branch address or the set attribute of the particular branch instruction) is used to index the pattern table. The entry corresponding to the index is then read from the pattern table. The two bit entry read from the pattern table indicates the prediction. After the particular branch instruction is resolved taken/not taken, the state encoded in the corresponding entry in the first level of storage is updated accordingly, and the corresponding entry in the pattern table is updated accordingly.

In another system proposed by the authors of the present invention in IBM Technical Disclosure Bulletin, Vol. 36, No. 12, December 1993, a Branch Context Register History Table (BCRHT) is used to store bits that predict the outcome of branch instructions. The bits of the BCRHT are accessed using the address of a given branch instruction to derive a vector of predictors for the given branch instruction. This vector is indexed by the value maintained in a global branch action vector that stores an n-bit binary value representing the actions of the last n-branches prior to the given branch instruction. This index selects the component of the vector of predictors which will be used to predict the action of the given branch instruction. Once the branch instruction is resolved, the component of the vector of predictors that was used is updated, if necessary. If the updated vector of predictors is different than the original vector, the original vector is replaced with the updated vector.

SUMMARY OF THE INVENTION

The object of the invention is to provide a mechanism to efficiently predict, with a high degree of accuracy, the outcome of conditional branch instructions.

According to the present invention, a history table is utilized to record a context oriented predictor associated with one or more branch instructions. The context oriented predictor preferably is derived from the history table by incorporating within each entry of the history table a vector of branch predictors. This vector comprises for each value of n (where n can be arbitrarily set, yet preferably remains fixed within a given implementation), a set of $2^n$ predictors. When the prefetching action of a processor causes the history table to be accessed, the vector of predictors for a given branch, called the ancestor branch, is retrieved from the history table and stored. After n such retrievals, the action history of the last n branches is used to access a predictor from the vector of predictors that was associated with the n-th ancestor (or predecessor) of the next upcoming branch. This predictor is used to predict the n-th successor branch of the ancestor branch. If necessary, the subsequent action of such n-th successor branch is used to update the predictor derived from the vector associated with the ancestor branch, and the vector is restored to the history table at the location indexed according to the ancestor branch instruction.

The superiority of the context oriented predictor derives from the fact that the prediction of the action of the upcoming branch can be done much earlier than the decode time of the branch as it is not dependent on the address of the branch. Furthermore, by associating the predictor with an ancestor branch and the result of a series of branch resolutions the paths that represent action of the program prior to the execution of the branch are individualized more faithfully and more information is available to the prediction mechanism. The location of the branch being predicted is eventually exposed by the instruction fetch mechanism and although this address is not specifically used to predict the action of the branch it can be used when a combination of ancestor branch address and target branch address is employed to index a pool of branch predictors.

Other objects and advantages of the invention will become more fully understood upon consideration of the following detailed description presented in conjunction with the accompanying drawings.

DETAILED DESCRIPTION OF THE PRESENT INVENTION

First, a description is set forth relative to how instructions are fetched and executed in a typical high performance processor. Then, the structure and operations of a machine using a branch history table according to the present invention are given in more detail. The description below embodies the present invention in a RISC architecture processor; however, the present invention is not limited in this respect and may be embodied in non-RISC architecture processors without loss of effectiveness or generality.

Figure 2:
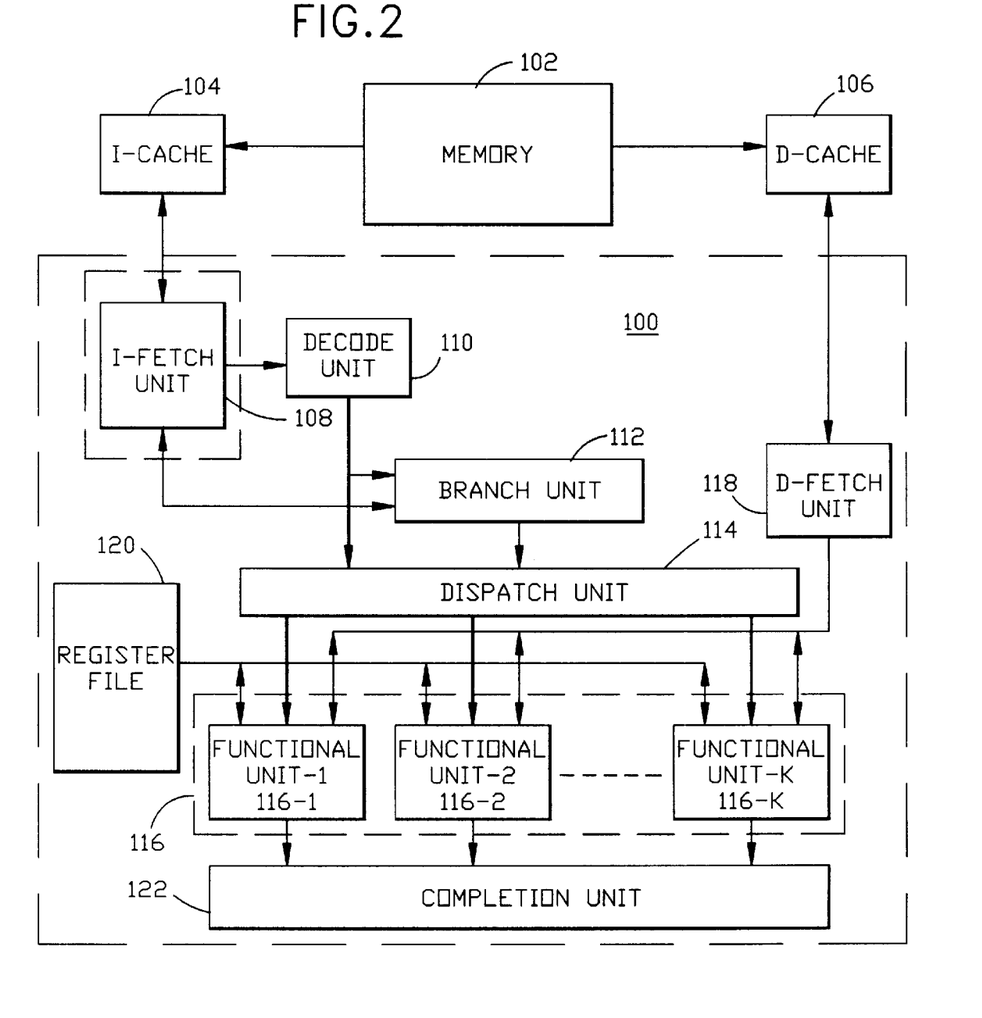
FIG. 2 is a functional block diagram of a conventional processor.

FIG. 2 illustrates the essential features of a typical high performance processing system. For descriptive purposes only, FIG. 2 emphasizes the portions of a RISC-like pipeline processor that are involved with branch prediction, and de-emphasizes or omits many other features necessary for a complete design.

The processing system includes a processor unit 100 and an associated memory unit 102. The memory unit 102 holds program data and instructions to be executed on the processor unit 100. The instructions stored in the memory unit 102 may include branch instructions.

As is conventional, the memory unit 102 is interfaced with an instruction cache unit 104 and a data cache unit 106 such that frequently used instruction and data portions of the memory unit 102 are kept in an instruction cache unit 104 and data cache unit 106, respectively. Alternatively, the instruction and data cache units 104,106 may be merged into a single unified cache. Access time for the cache units 104, 106 are typically much smaller than that of the memory unit 102. The instruction cache and/or data cache units 104,106 may also be comprised of multiple caches or multilevel caches as is also well known.

Typically, the instructions/data stored in the instruction cache 104 and data cache 106, respectively, are divided into lines or blocks. An instruction fetch unit 108 that fetches one or more blocks of instructions stored in the instruction cache 104 into a decode unit 110. The decode unit 110 forwards the branch and condition register update instructions to a branch unit 112 for execution and forwards sequential (non-branch instructions) to a dispatch unit 114. The dispatch unit 114 analyzes dependencies among pending instructions, and schedules execution of instructions on one or more functional units 116.

A D-Fetch unit 118 handles fetching of blocks of data from the data cache 106 into the functional units 116 as needed. The data cache unit 106 holds data values used as source operands by the instructions and some of the data values generated by executed instructions. Since multiple memory-resident data values may be simultaneously required by the functional units 116 and multiple memory-bound results may be simultaneously generated, the data cache unit 106 is typically multi-ported.

The processing unit 100 also includes a register file 120 containing a set of registers. The register file 120 provides operands to the functional units 116 for executing instructions and also receives results of execution. This set is further broken down into architecturally visible set of registers and architecturally invisible registers. Architecturally visible, or architected registers, refer to the fixed set of registers that are accessible to the assembly level programmer (or the compiler) of the machine. Such a register file 120 is well known in prior art.

Each functional unit 116 may be capable of executing some or all types of instructions. The functional units 116 receive input source operands from and write the output results to the register file 120 and/or the data cache unit 106. In the preferred embodiment, all the functional units 116 are identical and hence capable of executing any instruction. Alternatively, the functional units 116 may be asymmetric, where a specific unit is capable of executing only certain subset of instructions. In this case, the dispatch unit 114 must be aware of this asymmetry and schedule the instructions appropriately.

The processor unit 100 also includes a completion unit 122 responsible for completing instruction execution in an order considered a valid order by the architecture. Even though the functional units 116 may execute instructions out-of-order, the processor unit 100 may or may not be allowed to complete the instructions in the same order, depending on the architectural constraints.

The branch unit 112 processes instructions decoded as branch instructions and controls the fetching of instructions by the I-fetch unit 108. There are three types of branch instructions that can occur within a program execution:

TYPE 1—branch instructions that are never taken;
TYPE 2—branch instructions that are always taken; and
TYPE 3—branch instructions that have been taken and subsequently not taken, typically referred to as conditional branch instructions.

TYPE 1 branch instructions are ignored by the branch unit 112 in terms of effecting the prefetching within the processor. The present invention concerns itself with TYPE 2 and TYPE 3 branch instructions. TYPE 3 branch instructions are identified by the branch unit 112, and once identified the branch unit 112 operates to predict the current dynamic instance of the conditional branch instruction. After predicting the outcome of the conditional branch instruction, the instruction fetch address stored by the I-fetch unit 108 is updated according to the prediction. If the conditional branch instruction was predicted to be taken, the I-fetch unit 108 is updated with the non-sequential target address of the branch instruction. In this case, the I-fetch unit 108 may speculatively load instructions from the predicted path beginning at the target address of the conditional branch instruction. If the conditional branch instruction was predicted to be not-taken, the I-fetch unit 108 is updated with the next sequential address in the instruction sequence. In this case, the I-fetch unit 108 may speculatively load instructions from the predicted path beginning at the address of the next sequential address.

When the branch unit 112 determines that the conditional branch instruction has been resolved, the instruction fetch address stored by the I-fetch unit 108 is updated according to the resolved branch instruction. A conditional branch instruction is considered resolved only after the condition register bit upon which it depends has been updated. More specifically, if the resolved branch instruction was predicted to be taken and was resolved to be taken, normal operation of the computer processing system continues. Similarly, if the resolved branch instruction was predicted to be not-taken and was resolved to be not-taken, normal operation continues. However, if the resolved branch instruction was predicted to be taken and was resolved to be not-taken, the instruction fetch unit 108 is updated to fetch along the sequential (not-taken) path and instructions speculatively executed from the target (taken) path are discarded. Likewise, if the resolved branch instruction was predicted to be not-taken and was resolved to be taken, the instruction fetch unit 108 is updated to fetch along the target (taken) path and instructions speculatively executed from the sequential (not-taken) path are discarded.

The present invention is directed to the structure and operation of the branch unit 112 in predicting the outcome of conditional branch instructions. According to the present invention, the branch unit 112 includes a Branch History Table (BHT) that records a plurality of entries. Some of the entries correspond to TYPE 2 branch instructions. Other entries correspond to TYPE 3 conditional branch instructions. Each entry that corresponds to a conditional branch instructions includes a target address field that identifies the target address of the conditional branch instruction and predictor information that is associated with a plurality of paths that follow the conditional branch instruction. The predictor information indicates, for each path, whether the terminal conditional branch instruction at the end of the given path should be predicted taken or not taken. The process of generating a predictor for a given conditional branch instruction involves identifying the predictor information associated with the ancestor branch instruction corresponding to the given branch instruction, and selecting the appropriate predictor information that corresponds to the path leading from the ancestor branch instruction to the given branch instruction. This path is determined from the resolution of the conditional branches from the ancestor branch instruction to the conditional branch instruction that immediately precedes the given branch instruction.

Figure 3:
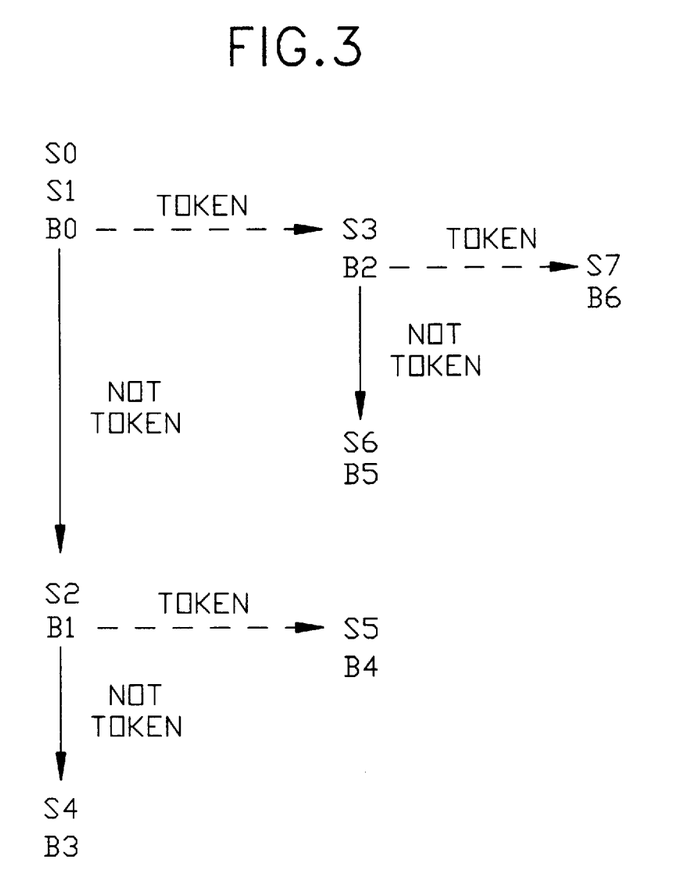
FIG. 3 is a pictorial representation of an instruction sequence stored in the memory system 102 of the processor.

For example, consider the program segment as illustrated in FIG. 3 wherein conditional branch instructions are labeled B0,B1,B2, . . . and non-conditional instructions are labeled S0,S1, S2 . . . , and wherein the entries of the BHT that correspond to such conditional branch instructions include predictor information corresponding to paths that are two branches deep from the branch instruction (i.e., n=2). In this case, the BHT records an entry corresponding to branch B0. This entry includes a target address field that identifies the target address of branch B0 and predictor information associated with each of the four paths (taken/taken, taken/not-taken, not-taken/taken, not-taken/not-taken) that follow the branch instruction B0. The predictor information indicates, for each path, whether the terminal conditional branch instruction at the end of the given path (B6,B5,B4,B3) should be predicted taken or not taken.

In addition, the BHT records an entry corresponding to branch B1. This entry includes a target address field that identifies the target address of branch B1 and predictor information associated with each of the four paths (taken/taken, taken/not-taken, not-taken/taken, not-taken/not-taken) that follow the branch instruction B1. The predictor information indicates, for each path, whether the terminal conditional branch instruction at the end of the given path should be predicted taken or not taken.

The BHT records similar entries that correspond to branches B2,B3,B4,B5 and B6. For example, the entry corresponding to branch B6 includes a target address field that identifies the target address of branch B6 and predictor information associated with each of the four paths (taken/taken, taken/not-taken, not-taken/taken, not-taken/not-taken) that follow the branch instruction B6. The predictor information indicates, for each path, whether the terminal conditional branch instruction at the end of the given path should be predicted taken or not taken.

In order to generate a predictor for a given conditional branch instruction, for example branch instruction B6, the entry associated with the ancestor branch instruction B0 that corresponds to the given branch instruction B6 is read from the BHT, and the appropriate predictor information within the given entry that corresponds to the path leading from the ancestor branch instruction B0 to the given branch instruction B6 is selected. This path is determined from the resolution of the conditional branches from the ancestor branch instruction B0 to the conditional branch instruction that immediately precedes the given branch instruction (B2 for B6). If the predictor generated for the conditional branch instruction B6 indicates that the branch instruction B6 should be predicted taken, the target address of the conditional branch instruction B6 is sent to the I-fetch unit 108. The target address of the conditional branch instruction B6 is preferably part of the entry read out from the BHT that is associated with the conditional branch instruction B6.

Figure 4:
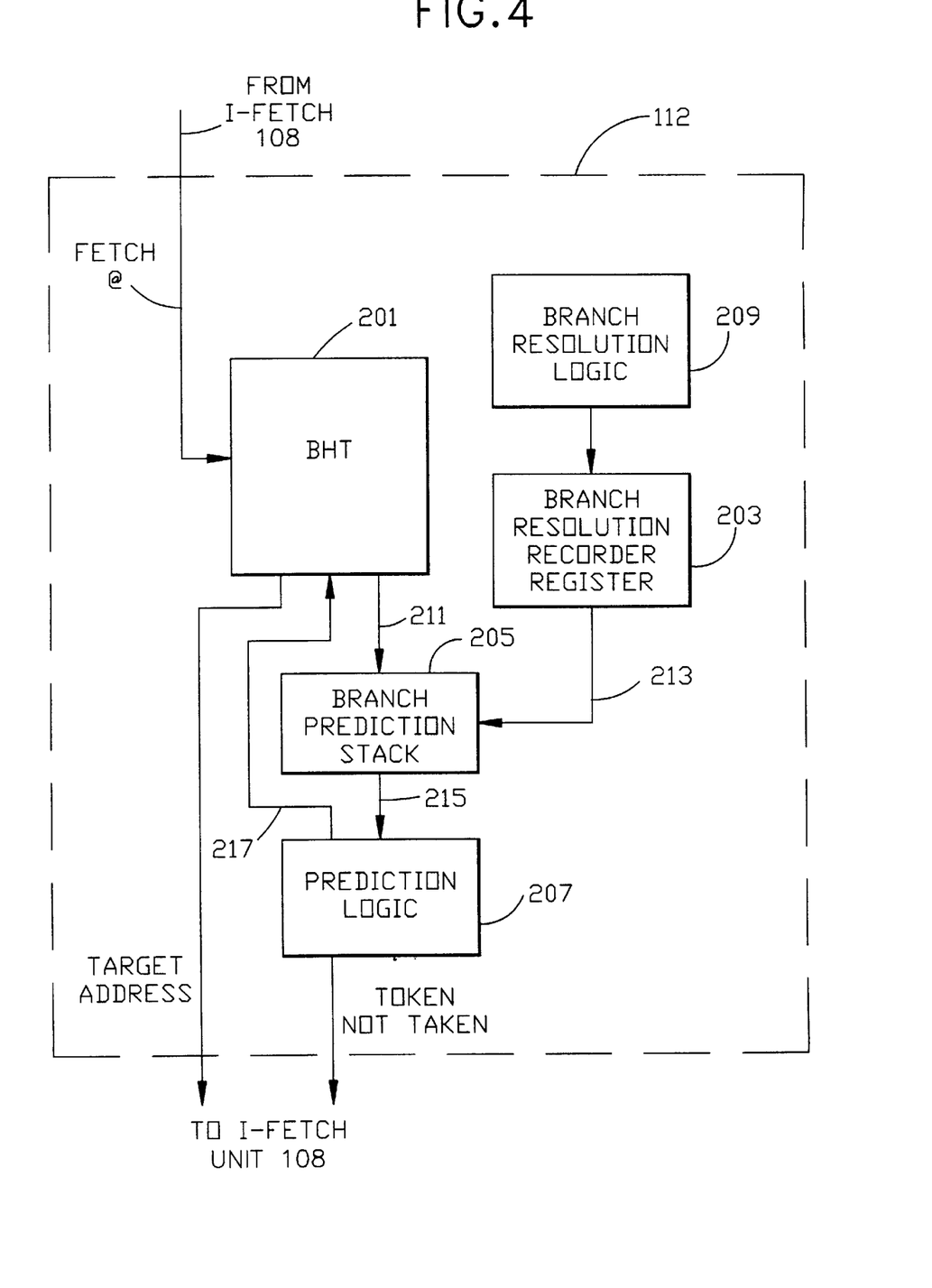
FIG. 4 is a functional block diagram of a branch unit including the Branch History Table (BHT), BHT Prediction Stack, BHT Prediction Update Logic and Branch Resolution Recorder Register of the present invention.

More specifically, as shown in FIG. 4, the branch unit 112 of the present invention includes the BHT 201, a branch resolution recorder register 203, a stack of branch addresses and prediction vectors (hereinafter referred to as branch prediction stack 205), and prediction logic 207 that operate cooperatively to predict the outcome of conditional branch instructions and, for those conditional branch instructions predicted taken, causes the BHT to forward the target address of the conditional branch being predicted to the I-fetch unit 108.

Figure 5A:
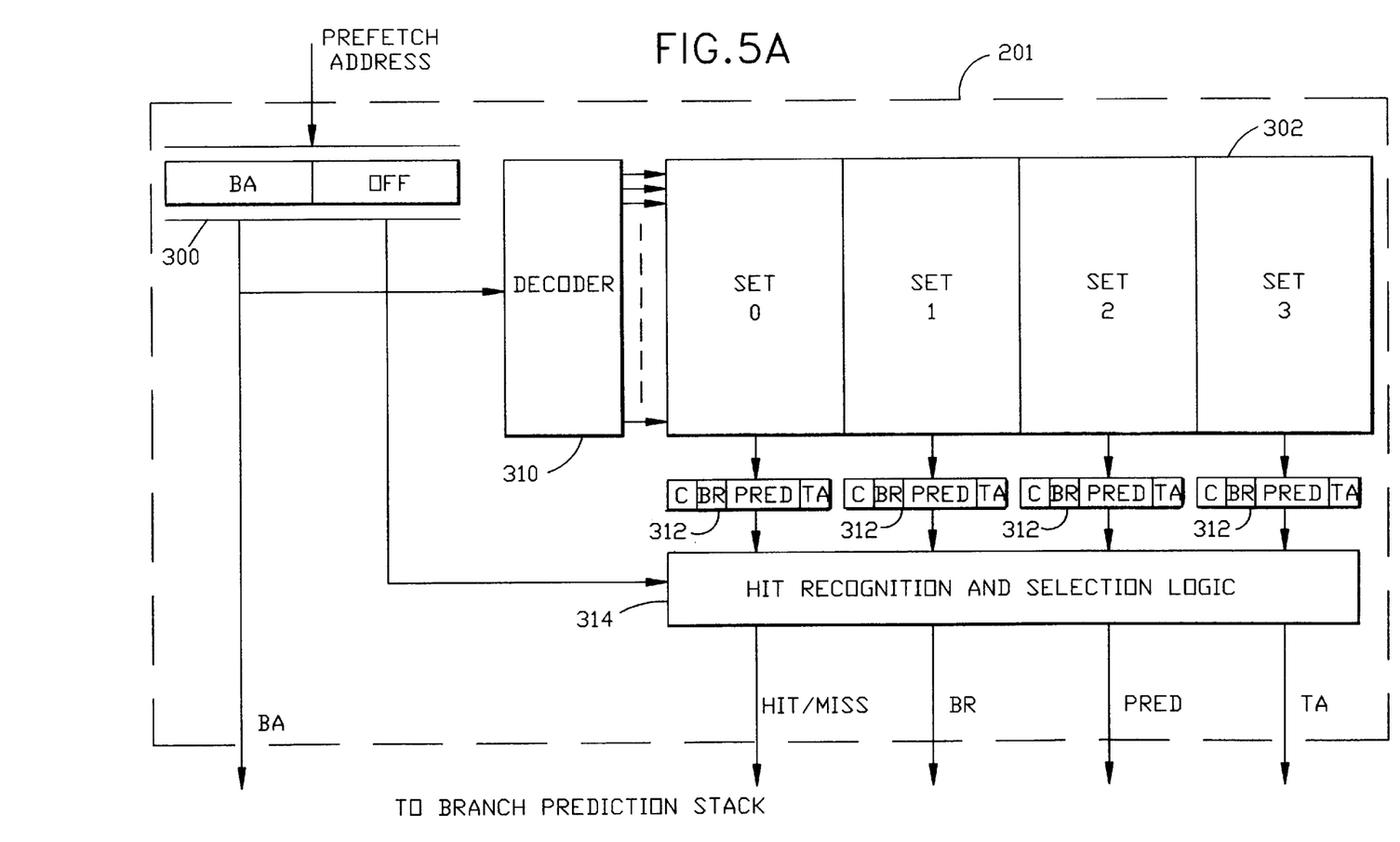
FIGS. 5(A)–(C) illustrate the structure of the Branch History Table (BHT) of FIG. 4 according to the present invention.
Figure 5B:
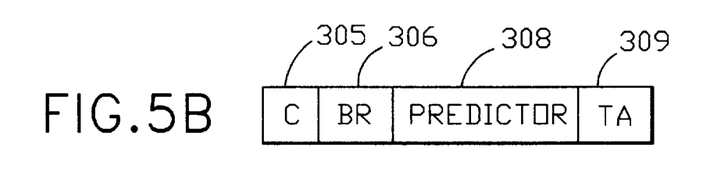
Figure 5C:
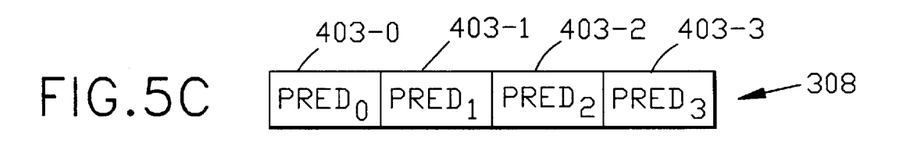

FIGS. 5(A)–(C) provide a more detailed description of the BHT 201. With reference to FIG. 5(A), the BHT 201 preferably includes an input latch 300 that stores the prefetch address X. The address X may be broken down into two parts: a block address BA and an offset OFF in the block. The address X stored in the input latch 300 is compared to an array 302 of entries. As shown in FIG. 5(B), each entry of the array 302 preferably includes a conditional bit B 305 that when set indicates that the entry s associated with a conditional branch instruction, a BR tag 306 that indicates the location of the corresponding branch instruction in the block, a vector 308 associated with the corresponding conditional branch instruction, and a target address field 309 that identifies the target address of the corresponding branch instruction. AS shown in FIG. 5(C), the vector 308 includes a plurality of sub-fields, for example sub-fields 403-0, 403-1 . . . 403-3 as shown, wherein each sub-field corresponds to a path that follows the conditional branch instruction identified by the associated BR tag 306. Each sub-field includes a predictor that indicates whether the branch instruction at the end of the path associated with the given sub-field should be predicted taken or not taken. The number of bits used in the predictor sub-fields 403-1, 403-2, . . . 403-3 is an implementation decision and does not effect the operation of the invention described herein. The simplest strategy is to use a single bit predictor sub-field where a '1' indicates the branch instruction in the given path should be predicted taken, and a '0' indicates the branch instruction in the given path should be predicted not taken. Typically, the bit is set to '1' when the most recent occurrence of the branch instruction at the end of the given path is resolved taken, or cleared to '0' when the most recent occurrence of the branch instruction in the end of the given path is resolved not taken. More than one bit may be used for the predictor sub-field. For example, the predictor sub-field may be a two bit saturating counter as described in J. Smith, "A Study of Branch Prediction Strategies," 24th International Symposium on Computer Architecture, May 1981, pp. 135–148. Moreover, the array 300 may be arranged in as a fully associative structure, a direct-mapped structure, or a set associative structure. As shown, the array 300 is arranged as a four way set associative structure.

More specifically, the first part BA of the full address X stored in the input latch 300 is supplied to a decoder 310 whose function is to activate the corresponding row of the array 302. Each entry of the activated row (the four entries as shown) is read out of the array 302 into storage elements 312. The entries loaded into the storage elements 312 along with the second part OFF of the full address X stored in the input latch 300 are supplied to hit recognition and selection logic 314. The hit recognition and selection logic 314 determines if the entries loaded into the storage elements 312 meet two conditions: the conditional bit B is set and the BR tag 306 is greater than the offset OFF of the prefetch address. If these two conditions are met, the hit recognition and selection logic outputs a "hit" signal, the block address BA and branch address BR (which identifies the full address of the branch instruction that meets the condition), the prediction vector associated with the branch instruction, and the target address TA associated with the branch instruction. If these two conditions are not met, the hit recognition and selection logic outputs a "miss" signal.

Note that more than one branch instruction that satisfies the two conditions may occur with a block. In this case, the hit resolution and prediction logic includes additional logic to pick one of such branch instructions, for example, the branch instruction whose BR tag 306 is nearest to the offset OFF of the prefetch address and larger than it.

The hit/miss signal, block address BA and branch address BR (which identifies the full address of a branch instruction), the prediction vector and the target address of the branch instruction generated by the hit recognition and select logic 314 of the BHT 201 are supplied to the branch prediction stack 205 via data path 211. The branch prediction stack 205 is preferably organized as a first-in first-out (FIFO) buffer that holds n entries, wherein each entry includes the full address of a branch instruction and the prediction vector associated with the branch instruction. Preferably, if a hit signal is supplied to the branch prediction stack, the block address BA and branch address BR are concatenated to form the full address of a branch instruction. The full address along with the associated prediction vector are added as the top entry in the branch prediction stack 205. Thus, the oldest entry within the branch prediction stack 205 corresponds to the conditional branch which is the n-th ancestor of the next upcoming conditional branch instruction.

In addition, the branch unit 112 includes branch resolution logic 209 that resolves the conditional branch instructions as either taken or not taken and sets a bit of the branch resolution recorder register 203 that is associated with a given conditional branch instruction to indicate that the branch instruction has been resolved taken or not taken via data path 213. For example, a bit of the branch resolution recorder register 203 having a binary value of "1" may indicate the conditional branch instruction associated with the bit has been resolved taken, and a bit of the branch resolution recorder register 203 having a binary value of "0" may indicate the conditional branch instruction associated with the bit has been resolved not-taken. Preferably, the bits of the branch resolution recorder register 203 represent the resolution of the latest n conditional branch instructions in sequential order.

The branch resolution logic 209 may resolve the conditional branch instructions in sequential order. In this case, the branch resolution recorder register 203 may be an n-bit shift register which is loaded by the branch resolution logic 209 by shifting in a bit indicating the taken/not taken resolution status of the most-recently resolved branch instruction. On the other hand, the branch resolution logic 209 may resolve the conditional branch instructions out of sequential order. In this case, when the bits of the branch resolution recorder register 203 still represent the resolution of the n conditional branches that precede any upcoming conditional branch in program sequence order, a more sophisticated mechanism may be needed to update the branch resolution recorder register 203.

Figure 6:
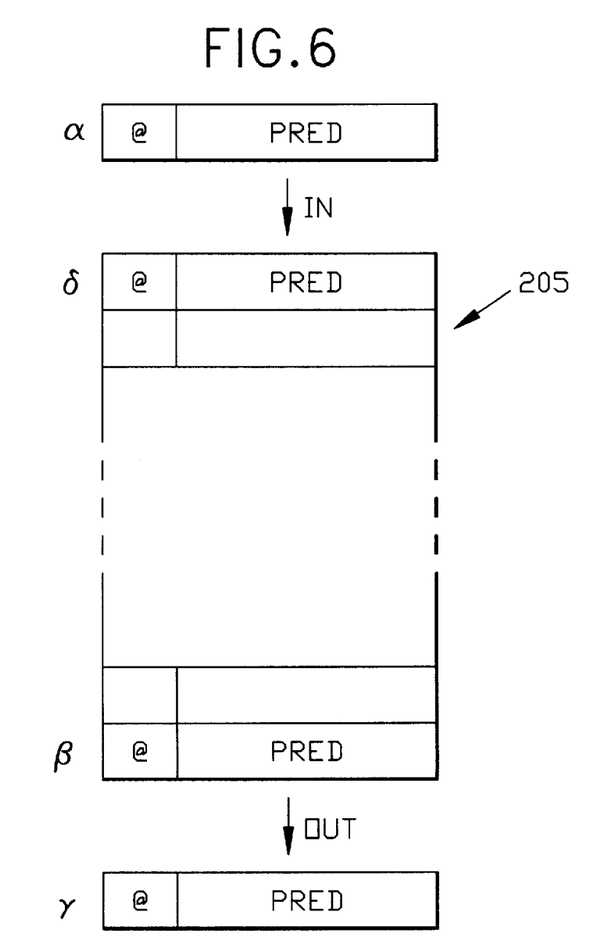
FIG. 6 is a pictorial illustration of the BHT Prediction Stack of FIG. 4.

The present invention utilizes the oldest entry in the branch prediction stack 205 along with the data stored in the branch resolution recorder register 203 to predict the next conditional branch instruction. For illustrative purposes only, consider the stack as shown in FIG. 6. An entry corresponding to the next conditional branch instruction, which is not part of the stack, is shown as $\alpha$. The entry corresponding to the n-th ancestor conditional branch instruction of the next conditional branch instruction $\alpha$, which is the oldest entry in the stack, is shown as $\beta$. The n−1 entries corresponding to conditional branch instructions between the n-th ancestor conditional branch instruction $\beta$ and the upcoming conditional branch instruction $\alpha$ are also part of the stack 205. The newest entry in the stack corresponds to the conditional branch instruction $\delta$ which precedes the upcoming conditional branch instruction $\alpha$. In addition, an entry that corresponds to the conditional branch instruction $\gamma$ which precedes the conditional branch instruction $\beta$ is not part of the stack as shown.

The process of generating a predictor for the next upcoming branch instruction $\alpha$ involves the prediction vector associated with the ancestor branch $\beta$ (which is stored as the oldest entry in the branch prediction stack 205) and the result of the resolutions of n−1 conditional branches between $\beta$ and $\alpha$ (which is stored in the branch resolution recorder register 203).

More specifically, the data within the branch resolution recorder register 203 specifies the path from the ancestor branch instruction $\beta$ to the next upcoming branch instruction $\alpha$, and is used to select the sub-field within predictor vector of the oldest entry in the branch prediction stack 205 that corresponds to such path. The selected predictor sub-field is then forwarded to the prediction logic 207 via data path 215. The prediction logic 207 analyzes the predictor sub-field to determine if the branch instruction should be predicted taken or not-taken. As indicated above, the number of bits used in the predictor sub-field is an implementation decision. If the predictor sub-field indicates the branch instruction should be predicted not-taken, logic 507 may trigger re-examination of the BHT to determine if the BHT includes another entry corresponding to a conditional branch instruction that occurs later in the prefetch block. If a matching entry is not found (or the re-examination results in another not-taken prediction), logic 507 generates a not-taken signal, which is forwarded to the I-fetch unit 108. However, if the predictor sub-field indicates the branch instruction should be predicted taken, logic 507 generates a taken signal which is forwarded to the I-fetch unit 108 and controls the BHT 201 via data path 217 to forward the target address of the branch instruction $\alpha$ to the I-fetch unit 108. The target address of the branch instruction $\alpha$ is read out from the entry in the BHT 201 that is associated with the branch instruction $\alpha$.

The BHT 201 of the present invention as described above preferably includes entries that correspond to TYPE 2 branch instructions. Such entries may be similar to the BHT entries corresponding to TYPE 3 branch instructions as shown in FIGS. 5(B) and (C) including conditional bit B 305, a BR tag 306 and target address field 309. The conditional bit B of such entries are cleared to indicate that the entry corresponds to a TYPE 2 branch instruction. In addition, because TYPE 2 branch instructions are always taken, the predictor field 308 of such entries are not utilized in predicting the outcome of such TYPE 2 branch instructions. If one of such entries is read from the BHT 201, the BHT 201 preferably generates a hit signal and forwards the target address of the entry to the I-fetch unit 108. The I-fetch unit 108 may speculatively load instructions from the predicted path beginning at the target address of the TYPE 2 branch instruction. If the TYPE 2 branch instruction is resolved not taken, then the BUT Update Logic generates a new entry in the BHT that correspond to a TYPE 3 branch instruction and initializes the new entry as discussed below. In addition, the I-fetch unit 108 is then updated to fetch along the sequential (not-taken) path of the TYPE 2 branch instruction and the instructions speculatively executed along the target (taken) path of the TYPE 2 branch instruction are discarded.

The BHT 201 may require correction. For example, the taken/not taken prediction of the branch instruction $\alpha$, which is stored in the prediction vector of the BHT entry associated with the branch instruction $\beta$, may be wrong; or the target address of the branch instruction $\alpha$, which is stored in the BHT entry associated with the branch instruction $\alpha$, may be wrong. In order to provide the capability to correct the BHT 201, the system of the present invention preferably includes BHT Update Logic that handles errors of action for TYPE 2 branch instructions, errors of target for both TYPE 2 and TYPE 3 branch instructions, and updates of prediction for TYPE 3 branch instructions. If the BHT has a TYPE 2 branch instruction which is resolved as not taken, the BHT Update logic updates the BHT entry by setting the conditional bit C 305 bit to indicate that the entry corresponds to a TYPE 3 branch instruction and the prediction vector of the entry is initialized as described below. The target address field of the entry is not modified. If an error of target occurs for either a TYPE 2 or TYPE 3 branch instruction, the newly resolved target address is used to update the existing BHT entry. The update of the prediction for TYPE 3 branches instructions is now illustrated.

Consider the instruction sequence that follows the conditional branch instruction $\beta$ as discussed above wherein a conditional branch instruction $\gamma$ immediately precedes the conditional branch instruction $\beta$. In this scenario, when the oldest entry in the stack 205 corresponds to the branch instruction $\beta$ and the branch instruction $\delta$ (which corresponds to the newest entry in the stack) has been resolved either taken or not taken, the BHT Update Logic stores:

1) data identifying the location of the BHT entry that corresponds to the conditional branch instruction $\gamma$, for example, the address of branch instruction $\gamma$;
2) the most recent prediction vector associated with the branch instruction $\gamma$;
3) the resolution status (taken/not-taken) of the branch instruction $\delta$; and
4) the bits of the branch resolution recorder register 203 used to predict the outcome of the branch instruction $\delta$ (such bits specify the path from the branch instruction $\gamma$ to the branch instruction $\delta$).

The address of branch instruction $\gamma$ and the most recent prediction vector associated with the branch instruction $\gamma$ may be loaded into the BHT Update Logic from the stack 205 as the entry corresponding to branch instruction $\gamma$ is shifted out of the stack 205. The resolution status (taken/not-taken) of the branch instruction $\delta$ may be supplied to the BHT Update Logic by the branch resolution logic 209.

The BHT Update Logic updates the prediction vector of the BHT entry associated with the branch instruction $\gamma$, if need be, by first selecting the appropriate predictor sub-field within the most recent prediction vector associated with the branch instruction $\gamma$. The appropriate predictor sub-field corresponds to the path from the branch instruction $\gamma$ to the branch instruction $\delta$ as specified by the bits of the branch resolution recorder register 203 used to predict the outcome of the branch instruction $\delta$. The BHT Update Logic then updates the selected predictor sub-field according to the resolution status of the branch instruction $\delta$. For example, if a "1" bit predictor sub-field is implemented and the selected predictor sub-field does not match the resolution status of the branch instruction $\delta$, the predictor sub-field may be updated to match the resolution status of the branch instruction $\delta$. If there is no change to the selected predictor sub-field, the operation of the BHT Update Logic ends. However, if the selected predictor sub-field is updated, the updated predictor sub-field is integrated into the predictor vector associated with the branch instruction $\gamma$ and the updated predictor vector is written to the BHT at a location identified by the address of the branch instruction $\gamma$.

The initialization of the BHT 201 may be accomplished using many different approaches. For example, the BHT 201 may be initially cleared and all branches assumed nonexistent or not taken. Then, as taken branches are resolved, entries associated with these branches are made in the BHT 201 which specify the branches as unconditional and taken to their appropriate target. If a entry within the BHT 201 is subsequently not taken, then the conditional branch bit is set and the predictor vector for this branches n-descendants is set to an initial value, for example, all taken. As the predictor is used the initial value will be modified as appropriate based on the resolutions of the descendant branches for which the predictor vector components are used. Prior to the detection of the n-th conditional branch the update procedure will be bypassed and the initial values within the branch prediction stack 205 will indicate that certain entries are invalid, for example, by containing some default initial value. In this case, the prediction of the conditional branch will also use a default option.

As described above, the BHT of the present invention includes entries that correspond to both TYPE 2 and TYPE 3 branch instruction and a branch resolution recorder register that records the resolution status of the last TYPE 3 branch instructions. The predictor for the next upcoming branch instruction is generated by reading the prediction vector associated with the n-th ancestor conditional branch instruction and the result of the resolutions of n−1 conditional branches between the ancestor conditional branch instruction and the next upcoming conditional branch instruction as stored in the branch resolution recorder register. Thus, utilizing this approach, a TYPE 2 branch instruction can never be an ancestor. However, the present invention is limited in this respect. In the alternative, the branch resolution recorder register may record the resolution status of the last TYPE 2 and/or TYPE 3 branch instructions. In this case, the predictor for the next upcoming branch instruction is generated by reading the prediction vector associated with the n-th ancestor branch instruction and the result of the resolutions of n−1branches between the ancestor branch instruction and the next upcoming branch instruction as stored in the branch resolution recorder register. Thus, in this case, the prediction scheme makes no distinction between TYPE 2 and TYPE 3 branch instructions.

In an alternate embodiment, two separate tables may be used for TYPE 2 and TYPE 3 branch instructions., respectively. A first BHT, which is preferably the BHT of the present invention as described above, is used to predict TYPE 3 branch instructions. And a second BHT, which may be a conventional BHT, is used to predict TYPE 2 branch instructions. If a TYPE 2 branch instruction is predicted taken and resolved not-taken (i.e., becomes a TYPE 3 branch instruction), the entry corresponding to such branch instruction is removed from the second BHT and a new entry is made in the first BHT.

In another embodiment, the present invention may be embodied in a DHT. As described above, a DHT predicts the action of a branch rather than predicting the action and target address of taken branches as does the BHT. The DHT typically employs the address of the branch and recent branch actions to index into a table of predictors that predict the action of the branch. According to the present invention the address of the ancestor branch can be used as a substitute for the address of the branch in the indexing operation. As no information is maintained about branches previously encountered, preferably all branches (TYPE 1, TYPE 2 and TYPE 3) are considered in defining the spacing between the ancestor branch instruction, the branch instruction whose address is used to index the table of predictors, and the successor branch instruction for which the predictor is used. Preferably, the entries of the DHT include a plurality of context oriented predictors which are associated with the address of an ancestor branch and based upon the intermediate action history of the branches between the ancestor branch instruction and the branch instruction being predicted.

The value of n in this invention is arbitrary, but may be fixed within the implementation as it determines the width of hardware registers. The same may be applied to the type of predictors used as a component of the prediction vector.

The context oriented predictor of the present invention may be distinguished from a correlated branch predictor, which is a predictor based on the address of a branch and the action of the last n branch instructions. A context oriented predictor is superior to a correlated branch predictor in the following situations:

1) in those situations where an earlier predictor is desired, as the context predictor is based on the address of the ancestor branch rather than the address of the branch being predicted.
2) in those situation where the number of predictors is not a constraining factor. Where the number of predictors approximates the number of alternative paths, for the depth of the action sequence.
3) in those situations where a prediction based on a short action sequence is required.

Other embodiments of the invention will be apparent to those skilled in the art from consideration of the specification and practice of the invention disclosed herein. It is intended that the specification and examples be considered as examples only invention being indicated the invention being indicated by the claims.

We claim:

1. In a data processing system wherein sequences of instructions stored in memory are executed by at least one processor unit, and wherein the sequences of instructions stored in memory include one or more branch instructions, an apparatus for predicting the outcome of branch instructions comprising:
    a table storing a plurality of entries each associated with a branch instruction, wherein each entry includes a set of predictors each corresponding to an execution path leading from said associated branch instruction to a terminal branch instruction, wherein each predictor stores data for predicting the outcome of said terminal branch instruction at the end of the corresponding path;
    means for reading out from said table an entry that is associated with an access signal supplied to said table;
    means for determining an execution path leading from said branch instruction associated with said entry read out from said table to an upcoming branch instruction;
    means for selecting a predictor within said set of predictors included in said entry read out from the table that corresponds to said execution path; and
    means for generating a prediction of the outcome of said upcoming branch instruction according to data stored in the selected predictor.

2. The apparatus of claim 1, wherein each particular entry of said table includes a branch identification field that identifies the branch instruction associated with the particular entry.

3. The apparatus of claim 1, wherein the data processing system includes data fetch means for fetching data from memory for speculative execution by said data processing system according to the prediction of the outcome of the upcoming branch instruction.

4. The apparatus of claim 3, wherein said access signal is a portion of an instruction fetch address that identifies a block of instructions stored in memory to be fetched for execution by said data processing system.

5. The apparatus of claim 3, wherein each particular entry of said table includes a target address field that identifies a portion of the target address of the branch instruction associated with the particular entry, and wherein said data fetch means fetches data from a location in said memory that is identified by said target address field of the entry associated with said upcoming branch instruction if said prediction of the upcoming branch instructing indicates that the outcome of the upcoming branch instruction will be taken.

6. The apparatus of claim 1, wherein each entry is associated with a plurality of branch instructions.

7. The apparatus of claim 6, wherein said access signal is a portion of a branch instruction address identifying a branch instruction to be executed by said data processing system.

8. The apparatus of claim 7, wherein association between an entry of the table and each particular branch instruction of said plurality of branch instructions is determined by transforming a portion of the branch instruction address of the particular branch instruction.

9. The apparatus of claim 1, further comprising means for updating the selected one predictor within said set of predictors included in said entry read out from the table according to the resolution status of said upcoming branch instruction.

10. In a data processing system wherein sequences of instructions stored in memory are executed by at least one processor unit, and wherein the sequences of instructions stored in memory include one or more branch instructions, a method for predicting the outcome of branch instructions comprising the steps of:
    storing in a table a plurality of entries each associated with a branch instruction, wherein each entry includes a set of predictors each corresponding to an execution path leading from said associated branch instruction to a terminal branch instruction, wherein each predictor stores data for predicting the outcome of said terminal branch instruction at the end of the corresponding path;
    reading out from said table an entry that is associated with an access signal supplied to said table;
    determining an execution path leading from said branch instruction associated with said entry read out from said table to an upcoming branch instruction;
    selecting a predictor within said set of predictors included in said entry read out from the table that corresponds to said execution path; and
    generating a prediction of the outcome of said upcoming branch instruction according to data stored in the selected predictor.

11. The method of claim 1, wherein each particular entry of said table includes a branch identification field that identifies the branch instruction associated with the particular entry.

12. The method of claim 1, further comprising the step of fetching data from memory for speculative execution by said data processing system according to the prediction of the outcome of the upcoming branch instruction.

13. The method of claim 12, wherein said access signal is a portion of an instruction fetch address that identifies a block of instructions stored in memory to be fetched for execution by said data processing system.

14. The method of claim 12, wherein each particular entry of said table includes a target address field that identifies a portion of the target address of the branch instruction associated with the particular entry, and wherein said data is fetched from a location in said memory that is identified by said target address field of the entry associated with said upcoming branch instruction if said prediction of the upcoming branch instructing indicates that the outcome of the upcoming branch instruction will be taken.

15. The method of claim 10, wherein each entry is associated with a plurality of branch instructions.

16. The method of claim 15, wherein said access signal is a portion of a branch instruction address identifying a branch instruction to be executed by said data processing system.

17. The method of claim 16, wherein association between an entry of the table and each particular branch instruction of said plurality of branch instructions is determined by transforming a portion of the branch instruction address of the particular branch instruction.

18. The method of claim 10, further comprising the step of updating the selected one predictor within said set of predictors included in said entry read out from the table according to the resolution status of said upcoming branch instruction.

19. In a data processing system wherein sequences of instructions stored in memory are executed by at least one processor unit, and wherein the sequences of instructions stored in memory include one or more branch instructions, an apparatus for predicting the outcome of branch instructions comprising:

a table storing a plurality of entries each associated with a branch instruction, wherein each entry includes a set of predictors each corresponding to an execution path leading from said associated branch instruction to a terminal branch instruction, wherein each predictor stores data for predicting the outcome of said terminal branch instruction at the end of the corresponding path, and wherein said table includes logic for reading out from said table an entry that is associated with an access signal supplied to said table;

a stack for storing said set of predictors included in entries read out from said table;

a register that stores, for each entry read from said table, data identifying an execution path leading from said branch instruction associated with said entry to an upcoming branch instruction; and prediction logic, coupled to said stack and said register, that selects a predictor within said set of predictors stored in said stack that corresponds to an ancestor branch instruction according to said data stored in said register, wherein said data stored in said register represents an execution path from said ancestor branch instruction to an upcoming branch instruction, and wherein said prediction logic generates a prediction of the outcome of said upcoming branch instruction according to the data stored in the selected predictor.

20. The apparatus of claim 19, wherein each particular entry of said table includes a branch identification field that identifies the branch instruction associated with the particular entry.

21. The apparatus of claim 19, wherein the data processing system includes I-fetch logic that fetches instructions from memory for speculative execution by said data processing system according to the prediction of the outcome of the upcoming branch instruction.

22. The apparatus of claim 21, wherein said access signal is a portion of an instruction fetch address that identifies a block of instructions stored in memory to be fetched for speculative execution by said data processing system.

23. The apparatus of claim 22, wherein each particular entry of said table includes a target address field that identifies a portion of the target address of the branch instruction associated with the particular entry, and wherein said I-fetch logic fetches a block of instructions from a location in said memory that is identified by said target address field of the entry associated with said upcoming branch instruction if said prediction of the upcoming branch instruction indicates that the outcome of the upcoming branch instruction will be taken.

24. The apparatus of claim 19, wherein each entry is associated with a plurality of branch instructions.

25. The apparatus of claim 24, wherein said access signal is a portion of a branch instruction address identifying a branch instruction to be executed by said data processing system.

26. The apparatus of claim 25, wherein association between an entry of the table and each particular branch instruction of said plurality of branch instructions is determined by transforming a portion of the branch instruction address of the particular branch instruction.

27. The apparatus of claim 19, further comprising update logic for updating the selected one predictor within said set of predictors included in said entry read out from the table according to the resolution status of said upcoming branch instruction.

* * * * *